(12) United States Patent
Sander et al.

(10) Patent No.: US 8,510,679 B2
(45) Date of Patent: Aug. 13, 2013

(54) OBJECT MAPPING TOOL WITH EASY CONNECTION DISCOVERY

(75) Inventors: Joachim Sander, Mannheim (DE); Tina Rauschenbach, Stuttgart (DE)

(73) Assignee: SAP AG, Walldorf (DE)

( * ) Notice: Subject to any disclaimer, the term of this patent is extended or adjusted under 35 U.S.C. 154(b) by 204 days.

(21) Appl. No.: 12/976,017

(22) Filed: Dec. 22, 2010

(65) Prior Publication Data

US 2012/0167012 A1 Jun. 28, 2012

(51) Int. Cl.
*G06F 3/048* (2006.01)

(52) U.S. Cl.
USPC ........................................ 715/841

(58) Field of Classification Search
USPC ........................................ 715/841
See application file for complete search history.

(56) References Cited

U.S. PATENT DOCUMENTS

| | | | | |
|---|---|---|---|---|
| 5,627,979 A | * | 5/1997 | Chang et al. | 715/763 |
| 6,823,495 B1 | * | 11/2004 | Vedula et al. | 715/805 |
| 7,676,756 B2 | * | 3/2010 | Vedula et al. | 715/763 |
| 7,712,042 B2 | * | 5/2010 | Hernandez-Sherrington et al. | 715/781 |
| 2004/0255269 A1 | * | 12/2004 | Santori et al. | 717/109 |
| 2005/0015732 A1 | * | 1/2005 | Vedula et al. | 715/805 |
| 2005/0021513 A1 | * | 1/2005 | Vedula et al. | 707/3 |
| 2005/0034083 A1 | * | 2/2005 | Jaeger | 715/863 |
| 2005/0060647 A1 | * | 3/2005 | Doan et al. | 715/514 |
| 2005/0138057 A1 | * | 6/2005 | Bender et al. | 707/102 |
| 2006/0282454 A1 | * | 12/2006 | Hernandez-Sherrington et al. | 707/102 |
| 2009/0144302 A1 | * | 6/2009 | Baldwin | 707/100 |
| 2010/0146436 A1 | * | 6/2010 | Jakobson et al. | 715/800 |
| 2010/0312766 A1 | * | 12/2010 | Horn | 707/737 |

* cited by examiner

*Primary Examiner* — William Bashore
*Assistant Examiner* — Henry Orr
(74) *Attorney, Agent, or Firm* — Kenyon & Kenyon LLP

(57) ABSTRACT

In an object development environment, source objects in a structured hierarchy are mapped to one or more target objects, also in a structured hierarchy. Dual view user interfaces with connection mapping tools may be provided to facilitate creation, deletion and maintenance of these mappings. The invention includes an improvement by providing a context menu as a fly-out menu from a particular object. The context menu may include global functions and a list of connected objects, each with supplemental object-specific functions.

15 Claims, 5 Drawing Sheets

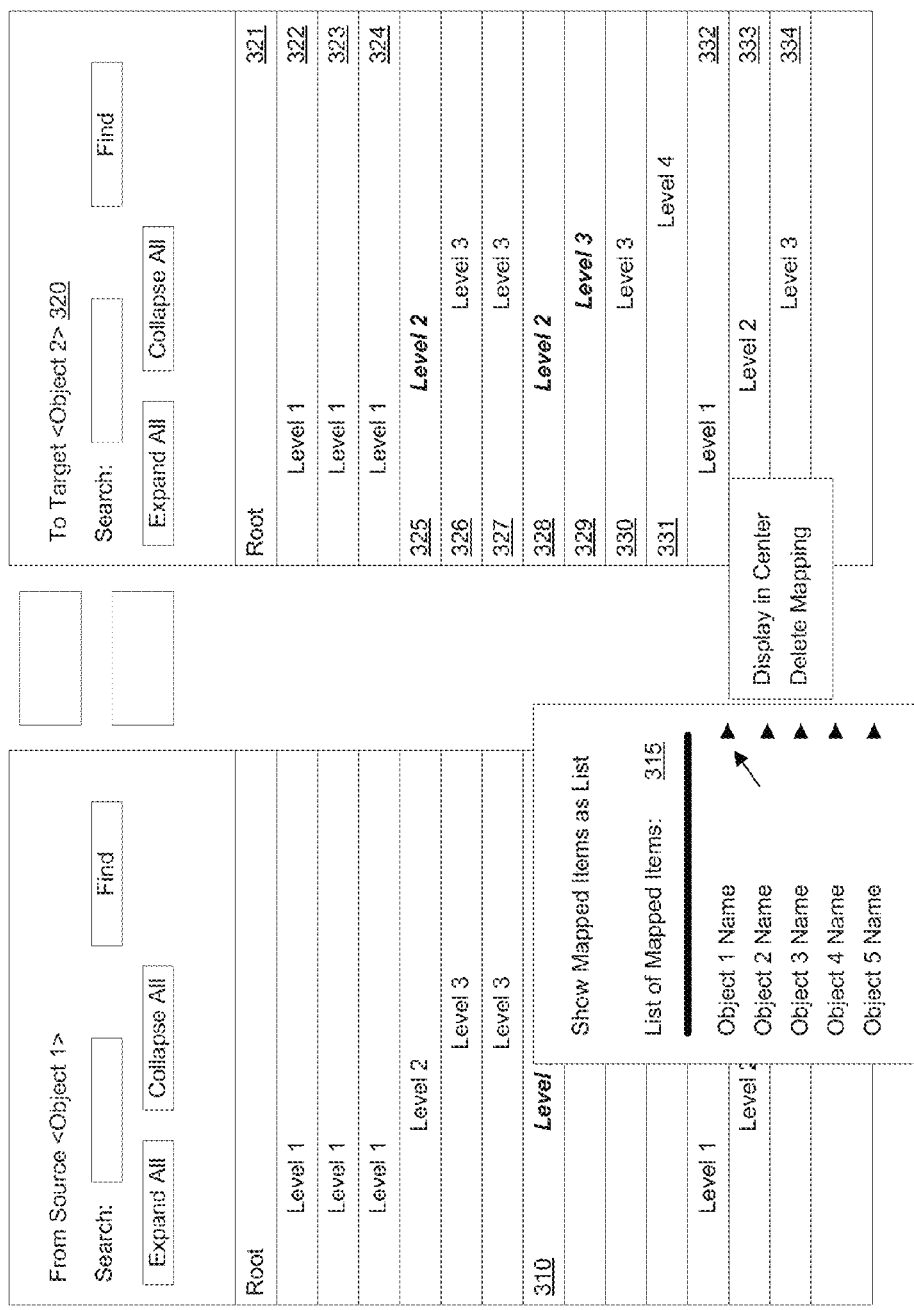

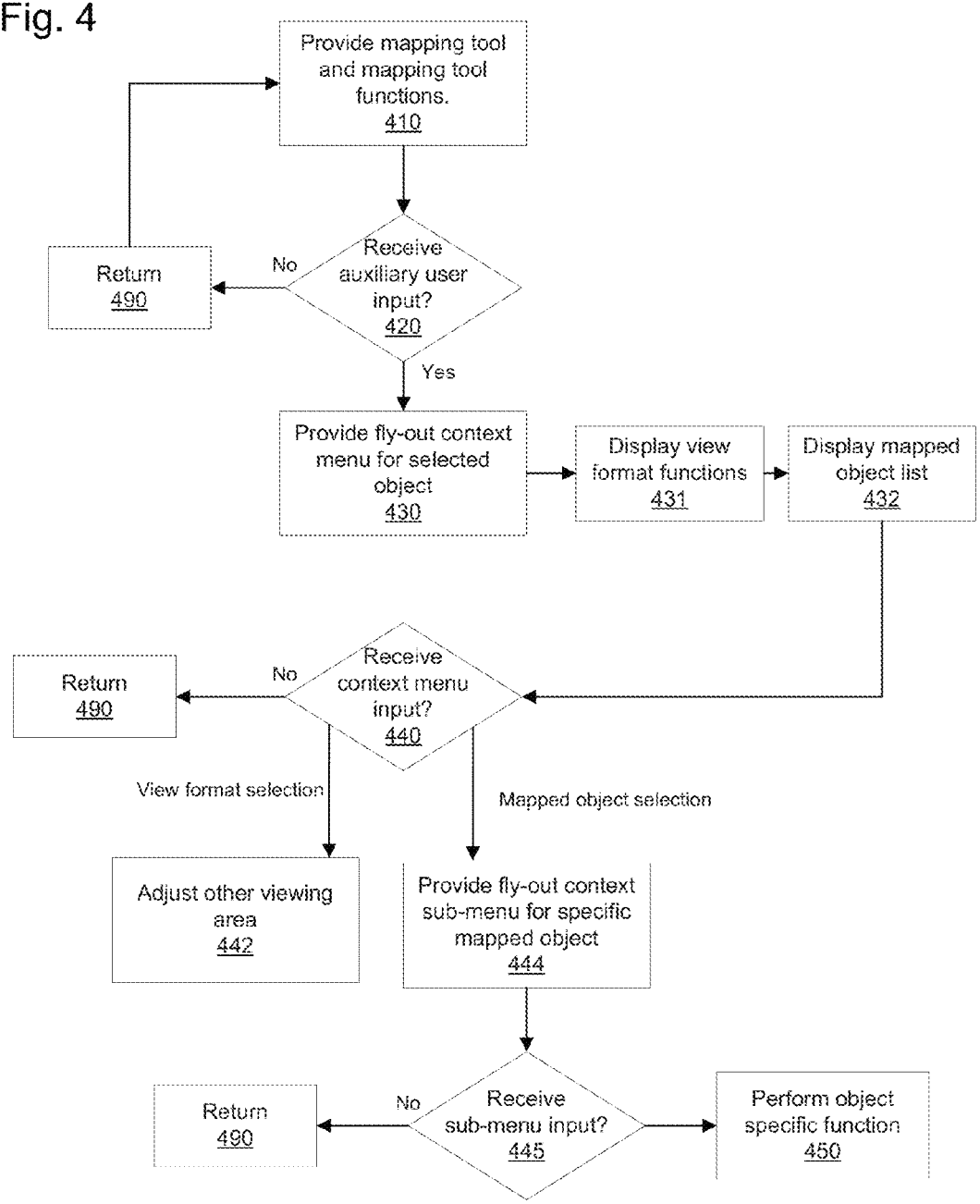

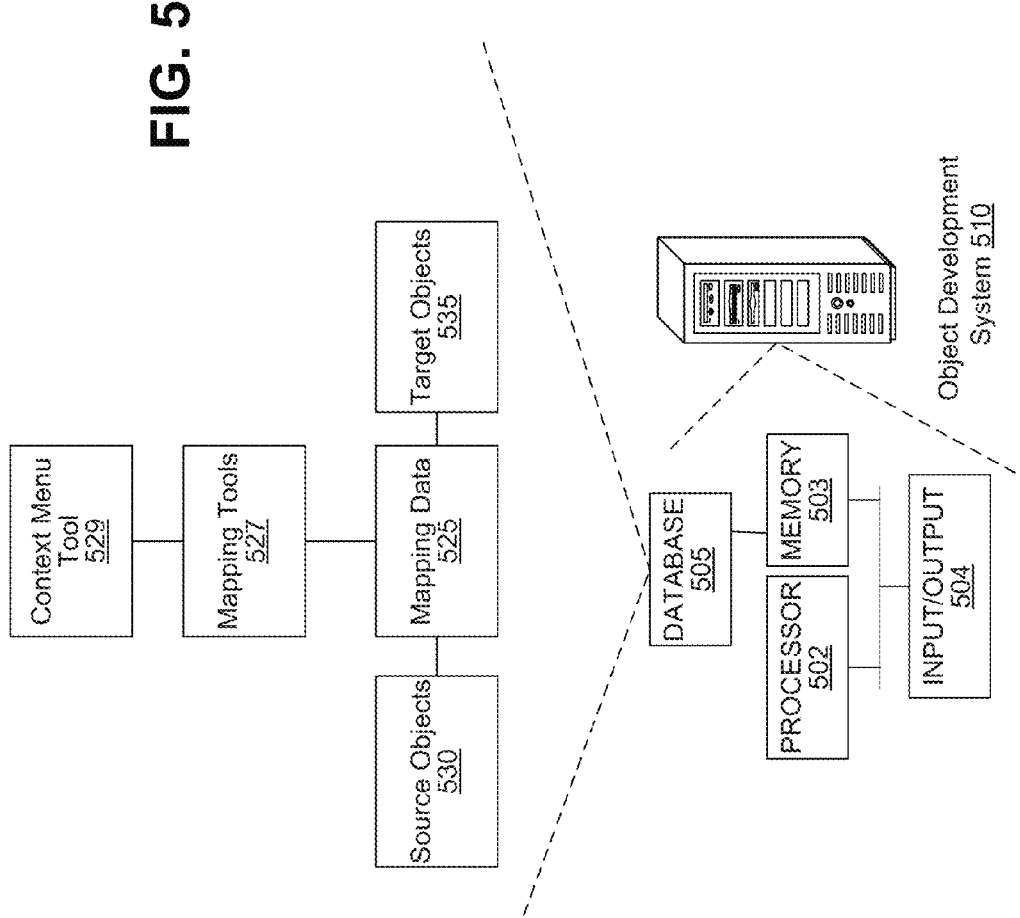

OBJECT MAPPING TOOL WITH EASY CONNECTION DISCOVERY

BACKGROUND

In large scale object oriented software design, large numbers of interrelated objects are present in a development environment. A Mapping Tool may consist of two vertical tables next to each other, one side showing source objects and the other side showing target objects. FIG. 1 illustrates an example of this tool. On the left hand side of the FIG. 1 example are source objects and on the right hand side target objects. Each table displays items (e.g., in a hierarchy) with folders and subfolders. The displayed hierarchy can include enormous numbers of objects, as software development progresses, and becomes increasingly complex. Therefore it is commonly the case that the hierarchies are much larger than the displayed items on the screen. Thus, viewing the whole hierarchy requires substantial scrolling with the limited view, as is known in the art.

This mapping tool may be used to establish, delete, or check connections between the items displayed in the tables. If only one or two connections have to be established, deleted, or checked, such a user interface may suffice and the mapping task may be easily performed. However, in the case of IDEs (Integrated Development Environments), hierarchies are far more complex. The user in this case may need to check, establish, or delete many connections between the items. Further, the user may now face the problem of losing focus and orientation, since the user may need to scroll up and down to get a full view of the hierarchies. The tool may allow a user to select a source object, which may highlight the connected target objects, e.g., as illustrated in FIG. 1. However, to find the different mapped items or items to be mapped, the user still has to scroll through the entire viewing area. For example, the highlighted source object in FIG. 1 may be connected to five or even some much larger number of target objects, but only three are currently visible. To find the others, the user must scroll through the entire viewing area, without overlooking an occurrence (i.e., a desired object) and without forgetting the initial occurrences while searching for subsequent target objects.

What is needed is a quick view of the set of connected target objects, while maintaining the full hierarchy view of all the target objects. Example embodiments of the present disclosure propose such a mapping tool enhancement.

BRIEF DESCRIPTION OF THE DRAWINGS

FIG. 3 illustrates an example wireframe illustration of a user interface, according to one example embodiment of the present invention.

FIG. 4 illustrates an example method, according to one example embodiment of the present invention.

FIG. 5 illustrates an example system, according to one example embodiment of the present invention.

DETAILED DESCRIPTION

Example embodiments of the present invention provide a quick view of the connected target objects, when a source object is selected. The quick view, referred to herein as a context menu, may also provide some functionality with respect to the whole group, and/or for each individual target object in the group. Example embodiments may accept user input, such as a right-click of a mouse on a source object, and provide the context menu in the mapping tool. This may optimize the navigation and make it more user friendly.

Figure 1:
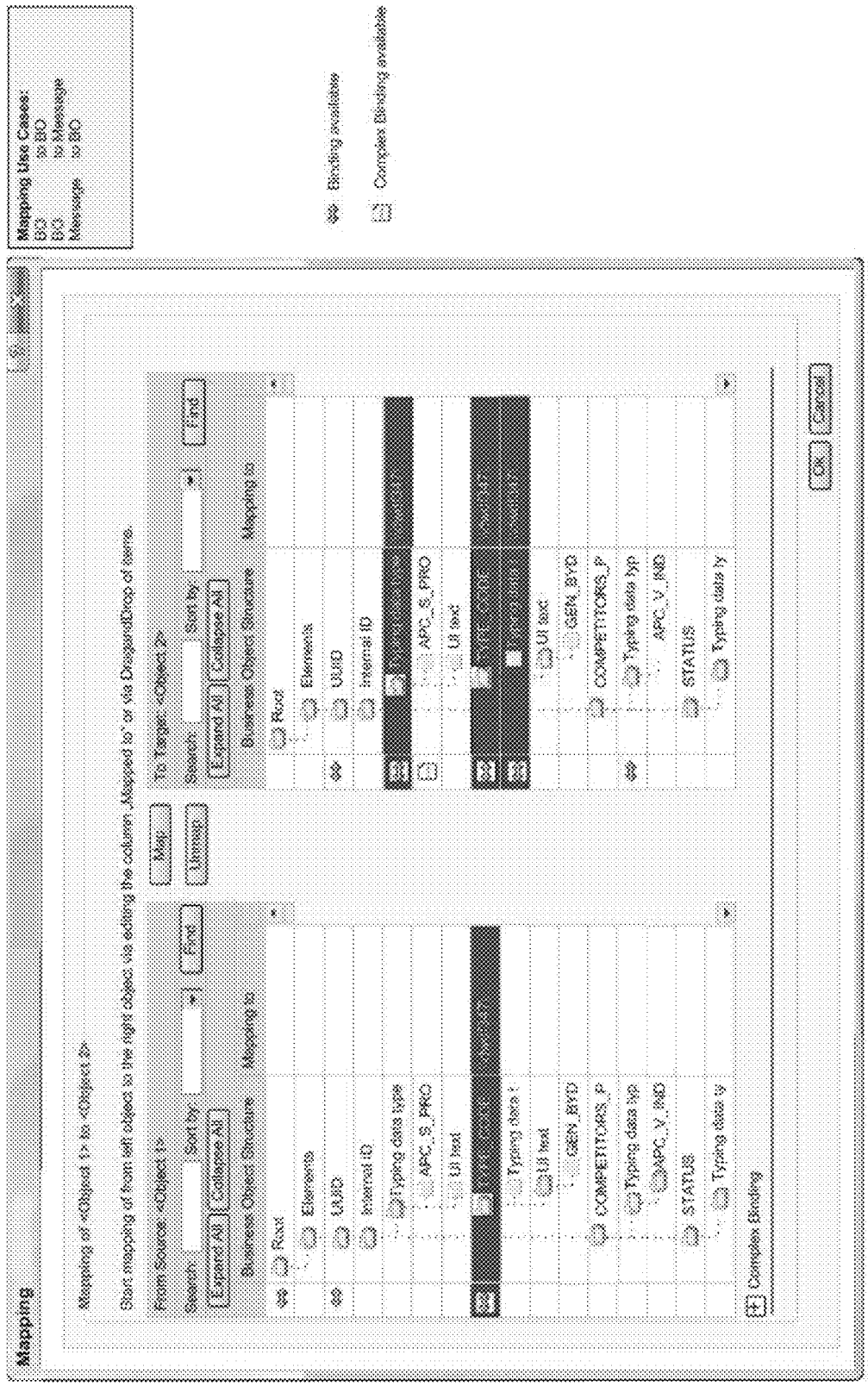
FIG. 1 illustrates a prior art mapping tool related to at least one example embodiment of the present invention.
Figure 2:
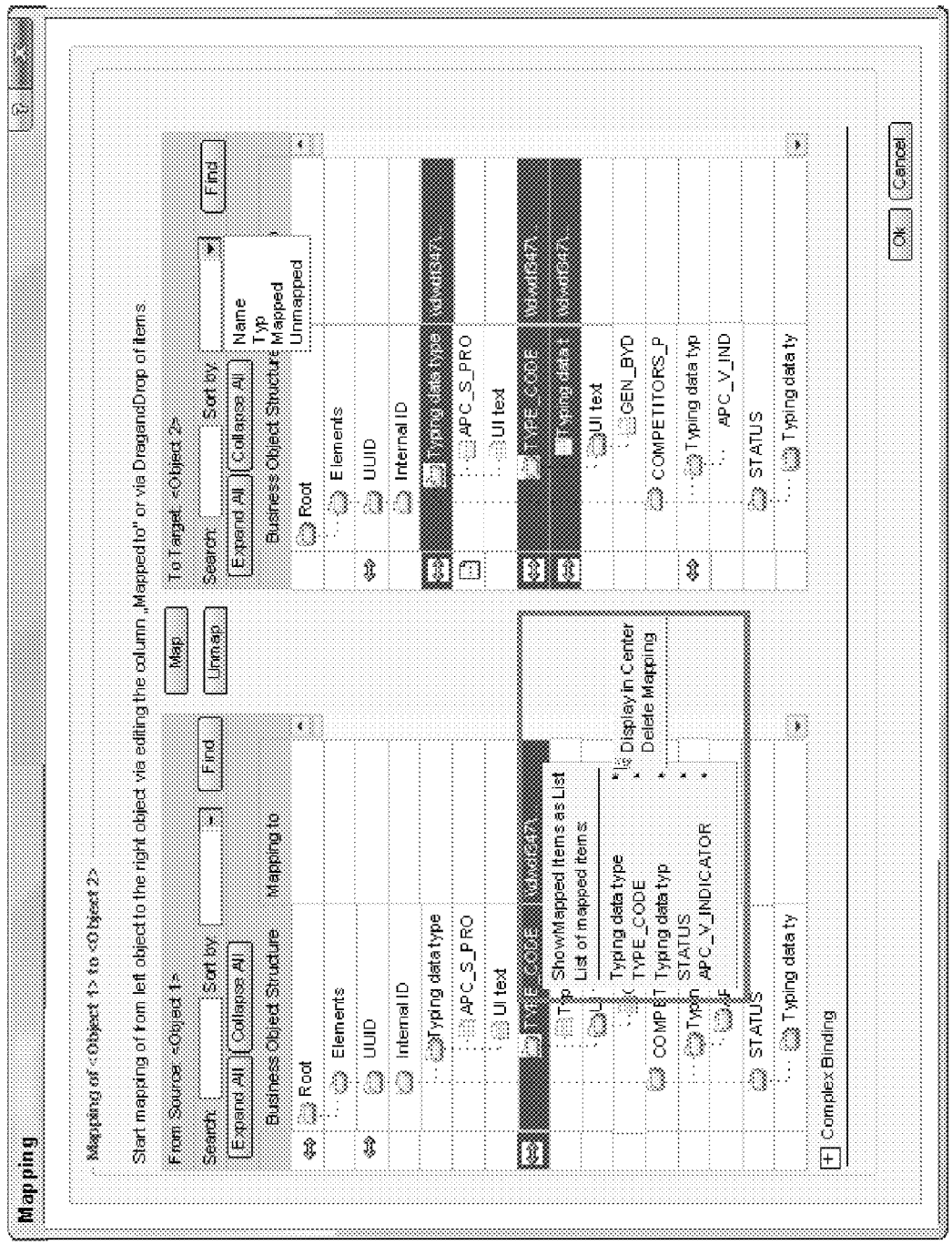
FIG. 2 illustrates an example screen shot of an example embodiment of the present invention.

FIG. 2 shows an example screenshot similar to FIG. 1, with an example of the context menu activated on a source object. FIG. 3 shows an example wireframe drawing similar to FIG. 2 with the mapped objects in bold. Example embodiments of the context menu may include any number of functions used in the mapping tool. For example, as illustrated in FIG. 3, an included function may be "Show Mapped Items as List." This may collapse the target object viewing area 320 with only the mapped, i.e. connected, target objects visible. This example may result in a list of the mapped objects and nothing else.

Alternatively, the function may collapse all of the sub-levels that do not include a mapped object. This embodiment may maintain the full hierarchical structure, while condensing as much as possible, but still showing each mapped object within the hierarchy. With this example implementation, each first level object 322 to 324 and 332 may be visible as sibling children of the root object that contains a mapped object. Second level object 325 may remain visible as a mapped object, but its sub-objects 326 and 327 may be collapsed. 328 and 329 may both be mapped objects and remain visible, along with sibling object 330, while sub-object 331 may be collapsed, since there is no mapped object in this group. Finally, 333 and 334 may also be collapsed into 332, since this whole group does not have an object.

Alternatively, the function may collapse all of the sub-levels that do not include a mapped object, and eliminate from view any peer objects that also do not include any mapped objects. In this example implementation, only root object 321 and objects 324, 325, 328, and 329 may be illustrated, with the remaining objects hidden from view (e.g., with a placement marker such as an ellipsis or a bracketed number indicating the number of hidden objects). Alternatively, some combination of these different view format functions may be included in the context menu. When target viewing area 320 is already in a viewing format that is part of the context menu functions, a reversing function may be included, such as "Show Mapped Items in Hierarchy," or "Expand All," etc.

After any functions that may be provided in the context menu, a quick view list of mapped objects 315 may be presented. Here, even without altering the target object viewing area 320, the user may see a list of all the mapped objects. Further, each object may have a sub-menu, that may include other functions of the context menu. FIG. 3 illustrates two such functions. The first is "Display in Center," which may cause the target object view 320 to center on this mapped object, and may cause the mapped object hierarchy to be expanded, as needed, if not already visible. Another example object-specific function may include "Delete Mapping," which may remove the connection between the source object and this target object. Another example object-specific function may include "Delete Item" (not shown). This may delete the actual target object from the system, or at least the current root object hierarchy. Other common functions such as "Copy," "Paste," "Cut," etc. may also be included.

FIG. 4 illustrates one example method for providing a fly-out quick-view context menu, according to one example embodiment of the present invention. The example method may start at 410 by providing the mapping tool and mapping tool functions (e.g., as illustrated in FIG. 1). These tools may be enhanced by a new user input, and when this auxiliary user input is received at 420, the example method may provide a fly-out context menu for a selected object (e.g., the source object the user right-clicked on). A right-click activated menu is only one customary example, any other auxiliary input may be used for activating a context menu.

The context menu may include view format functions (e.g., as displayed at 431) and a list of the mapped objects (e.g., as displayed at 432). The example method may now wait for input in the context menu, and return to the map tool functions if no input is received. While this example method is illustrated in linear execution, other embodiments are possible, and the primary map tool (e.g., as in 410) may be concurrently accepting input with the context menu. Using the example functions discussed above, the user may provide a view format selection, such as "Show Mapped Items as List," which may adjust the target viewing area at 442. Alternatively or additionally, the user may provide input selecting a mapped object from the mapped object list. This input may come in any number of forms, including a primary click, an auxiliary click (e.g., right-click), a pointer hover period over a mapped object name in the list (e.g., a "mouse-over" input), etc.

Upon selection, the example method may then provide a fly-out sub-menu, with functions for the specific mapped object selected. These too may adjust the view format or viewing area, such as "Display in Center." If no sub-menu input is received, or if context menu input or map tool input is received, the example method may return via 490. If menu input is received the example method may perform the object specific function selected by the user. This may close the context menu and any sub-context menu, or alternatively the menus may stay active until closed, until input is received elsewhere, or any number of other conditions. The example method may then return to 410, and continue providing the mapping tool with context menu.

FIG. 5 illustrates one example system, according to an example embodiment of the present invention. The example may include one or more server computer systems, e.g., development system 510. This may be one server, a set of local servers, or a set of geographically diverse servers. Each server may include an electronic computer processor 502, one or more sets of memory 503, including database repositories 505, and various input and output devices 504. These too may be local or distributed to several computers and/or locations. Database 505 may include data comprising the various software components of the other example embodiments of the present invention. For example, the database may include the source objects 530, the target objects 535, and mapping data 525. The database may include mapping tools 527 (e.g., executable code), which may further include a context menu tool 529, according to example embodiments of the present invention. These entities may be stored in database 505, or may be distributed across other systems, independently or connected via a communication network.

Any suitable technology may be used to implement embodiments of the present invention, such as general purpose computers. One or more system servers may operate hardware and/or software modules to facilitate the inventive processes and procedures of the present application, and constitute one or more example embodiments of the present invention. Further, one or more servers may include a computer readable storage medium, e.g., memory 503, with instructions to cause a processor, e.g., processor 502, to execute a set of steps according to one or more example embodiments of the present invention.

Further, example embodiments of the present invention are directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media, but not including transitory propagation signals. The instructions may be configured to be executed by a processor which, when executing the series of computer instructions, performs or facilitates the performance of all or part of the disclosed methods and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A method, comprising:
   receiving, with an electronic processor, user input at a first object within a mapping tool application;
   wherein the mapping tool provides visuals for displaying and functions for maintaining a connection mapping between a plurality of source objects and a plurality of target objects, wherein the mapping tool provides at least two viewing areas, a first viewing area displaying source objects and a second viewing area displaying target objects, wherein the mapping includes a function where a source object is selected and every target object having a mapped connection to the source object is indicated in the second viewing area, and wherein the second viewing area is limited to a field of view over a sub-set of target objects with a control function for changing which contiguous sub-set is currently viewed;
   producing a quick view list in response to the user input, which includes at least one global function that affects all of the target objects, wherein said list displays all target objects mapped to the first object;
   using the quick view list to manipulate at least one object on the list in response to additional user input, which includes at least one function, wherein the at least one function includes at least one of:
   focusing the second viewing area on the at least one object on the quick view list, and
   deleting a mapping connection between a target object represented by the at least one object on the quick view list and the first object.

2. The method of claim 1, wherein the first object is a source object.

3. The method of claim 1, wherein the plurality of source objects is a hierarchy of subobjects under a root source object, and the plurality of target objects is a hierarchy of subobjects under a root target object.

4. The method of claim 1, wherein the quick view list is a fly-out quick view list.

5. The method of claim 1, wherein the user input is a right-click.

6. The method of claim 1, wherein the at least one global function includes a function to toggle between at least the following view formats: a list view format and a structured hierarchical view format.

7. The method of claim 1, wherein the additional user input includes a mouse-over input.

8. A non-transitory computer-readable storage medium encoded with instructions configured to be executed by a processor, the instructions which, when executed by the processor, cause the performance of a method, comprising:
    receiving, with an electronic processor, user input at a first object within a mapping tool application;
    wherein the mapping tool provides visuals for displaying and functions for maintaining a connection mapping between a plurality of source objects and a plurality of target objects, wherein the mapping tool provides at least two viewing areas, a first viewing area displaying source objects and a second viewing area displaying target objects, wherein the mapping includes a function where a source object is selected and every target object having a mapped connection to the source object is indicated in the second viewing area, and wherein the second viewing area is limited to a field of view over a sub-set of target objects with a control function for changing which contiguous sub-set is currently viewed;
    producing a quick view list in response to the user input, which includes at least one global function that affects all of the target objects, wherein said list displays all target objects mapped to the first object;
    using the quick view list to manipulate at least one object on the list in response to additional user input, which includes at least one function, wherein the at least one function includes at least one of:
        focusing the second viewing area on the at least one object on the quick view list, and
        deleting a mapping connection between a target object represented by the at least one object on the quick view list and the first object.

9. The computer-readable storage medium of claim 8, wherein the first object is a source object.

10. The computer-readable storage medium of claim 8, wherein the plurality of source objects is a hierarchy of sub-objects under a root source object, and the plurality of target objects is a hierarchy of sub-objects under a root target object.

11. The computer-readable storage medium of claim 8, wherein the quick view list is a fly-out quick view list.

12. The computer-readable storage medium of claim 8, wherein the user input is a rightclick.

13. The computer-readable storage medium of claim 8, wherein the at least one global function includes a function to toggle between at least the following view formats: a list view format and a structured hierarchical view format.

14. The computer-readable storage medium of claim 8, wherein the additional user input includes a mouse-over input.

15. A system, comprising:
    an electronic processor in communication with an electronic storage medium and a visual output device, configured to:
    receive user input at a first object within a mapping tool application;
    wherein the mapping tool provides visuals for displaying and functions for maintaining a connection mapping between a plurality of source objects and a plurality of target objects, wherein the mapping tool provides at least two viewing areas, a first viewing area displaying source objects and a second viewing area displaying target objects, wherein the mapping includes a function where a source object is selected and every target object having a mapped connection to the source object is indicated in the second viewing area, and wherein the second viewing area is limited to a field of view over a sub-set of target objects with a control function for changing which contiguous sub-set is currently viewed;
    produce a quick view list in response to the user input, which includes at least one global function that affects all of the target objects, wherein said list displays all target objects mapped to the first object;
    use the quick view list to manipulate at least one object on the list in response to additional user input, which includes at least one function, wherein the at least one function includes at least one of:
        focusing the second viewing area on the at least one object on the quick view list, and
        deleting a mapping connection between a target object represented by the at least one object on the quick view list and the first object.

* * * * *